United States Patent
Suzuki et al.

(10) Patent No.: US 9,351,259 B2
(45) Date of Patent: May 24, 2016

(54) MOBILE STATION DEVICE, BASE STATION DEVICE, RADIO COMMUNICATION METHOD, AND INTEGRATED CIRCUIT

(71) Applicant: Sharp Kabushiki Kaisha, Osaka-shi, Osaka (JP)

(72) Inventors: Shoichi Suzuki, Osaka (JP); Tatsushi Aiba, Osaka (JP); Wataru Ouchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/419,043

(22) PCT Filed: Jul. 31, 2013

(86) PCT No.: PCT/JP2013/070793
§ 371 (c)(1),
(2) Date: Feb. 2, 2015

(87) PCT Pub. No.: WO2014/021394
PCT Pub. Date: Feb. 6, 2014

(65) Prior Publication Data
US 2015/0245300 A1 Aug. 27, 2015

(30) Foreign Application Priority Data
Aug. 3, 2012 (JP) .................................. 2012-172552

(51) Int. Cl.
*H04B 7/00* (2006.01)
*H04W 52/22* (2009.01)
(Continued)

(52) U.S. Cl.
CPC ............. *H04W 52/22* (2013.01); *H04L 5/0048* (2013.01); *H04W 52/146* (2013.01);
(Continued)

(58) Field of Classification Search
USPC ........................ 455/522, 69–70; 370/310–320
See application file for complete search history.

(56) References Cited

U.S. PATENT DOCUMENTS 8,873,443 B2 * 10/2014 Haim .................. H04W 52/146
370/311
8,982,801 B2 * 3/2015 Shin .................... H04W 52/146
370/311
(Continued)

FOREIGN PATENT DOCUMENTS

WO 2010/107907 A2 9/2010

OTHER PUBLICATIONS

3GPP TS 36.213 version 10.2.0 release 10, Jun. 2011, pp. 1-121.*
(Continued)

*Primary Examiner* — Fayyaz Alam
(74) *Attorney, Agent, or Firm* — Keating & Bennett, LLP

(57) ABSTRACT

Transmission power for an uplink signal is efficiently set. There are provided a reception unit 105 that receives from a base station device a first transmission power control command, a second transmission power control command, first information indicating whether or not accumulation of first transmission power control commands is enabled and second information indicating whether or not accumulation of second transmission power control commands is enabled, a transmission power setting unit 1015 that sets a first parameter value based on the first information and the first transmission control command, sets a second parameter value based on the second information and the second transmission control command, sets a first transmission power for a first reference signal using at least using a first parameter, and sets a second transmission power for a second reference signal using at least a second parameter, and a transmission unit 107 that transmits the first reference signal at the first transmission power and the second reference signal at the second transmission power to the base station device.

8 Claims, 9 Drawing Sheets

(51) Int. Cl.
*H04W 52/14* (2009.01)
*H04W 52/24* (2009.01)
*H04L 5/00* (2006.01)
*H04W 72/04* (2009.01)
*H04W 88/02* (2009.01)
*H04W 52/32* (2009.01)

(52) U.S. Cl.
CPC ......... *H04W 52/247* (2013.01); *H04W 52/248* (2013.01); *H04W 72/0446* (2013.01); *H04W 52/325* (2013.01); *H04W 88/02* (2013.01)

(56) References Cited

U.S. PATENT DOCUMENTS

| | | | | |
|---|---|---|---|---|
| 2011/0268028 | A1* | 11/2011 | Stern-Berkowitz | H04L 27/2613 370/328 |
| 2013/0114505 | A1* | 5/2013 | Haim | H04W 52/146 370/328 |
| 2015/0031410 | A1* | 1/2015 | Lim | H04W 52/146 455/522 |
| 2015/0105119 | A1* | 4/2015 | Eriksson | H04W 52/146 455/522 |
| 2015/0223174 | A1* | 8/2015 | Larsson | H04W 52/146 455/522 |

OTHER PUBLICATIONS

Official Communication issued in International Patent Application No. PCT/JP2013/070793, mailed on Sep. 3, 2013.
Sharp, "SRS Power Control for UL CoMP," 3GPP TSG RAN WG1 Meeting #69, R1-122384, May 21-25, 2012, pp. 1-3.
LG Electronics et al., "Way Forward on SRS Power Control," 3GPP TSG RAN WG1 #68bis, R1-121859, Mar. 26-30, 2012, 2 pages.
Zte, "Discussion on Category of Dedicated Parameters for CA," 3GPP TSG-RAN WG2 Meeting #71, R2-104988, Aug. 23-27, 2010, 4 pages.
Samsung, "Radio Resource Configuration Changes for CA, UE Specific," 3GPP TSG-RAN2#70 bis Meeting, R2-103795, Jun. 28 to Jul. 2, 2010, 8 pages.
Motorola, "Further Details on UL Power Control with CA," 3GPP TSG WG1 Meeting #62bis, R1-105625, Oct. 11-15, 2010, 2 pages.

* cited by examiner

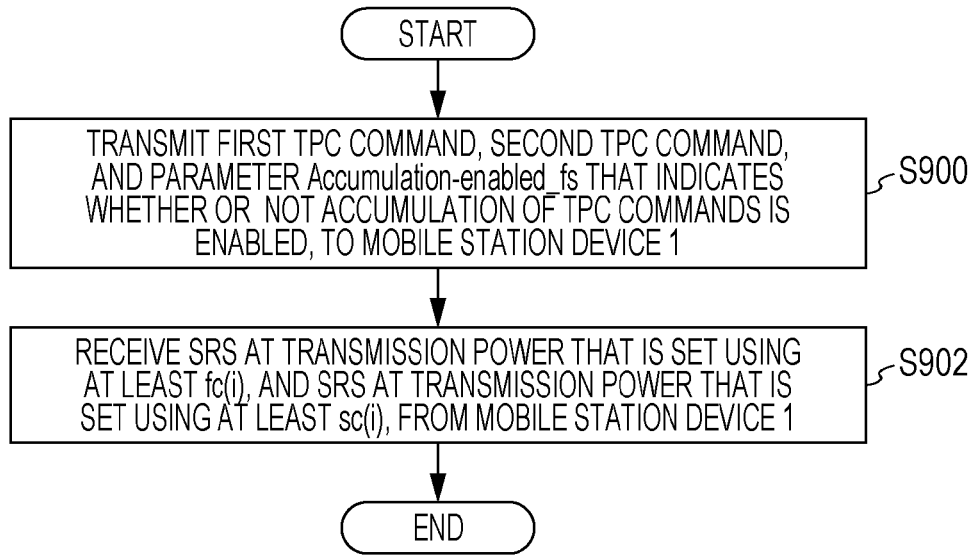
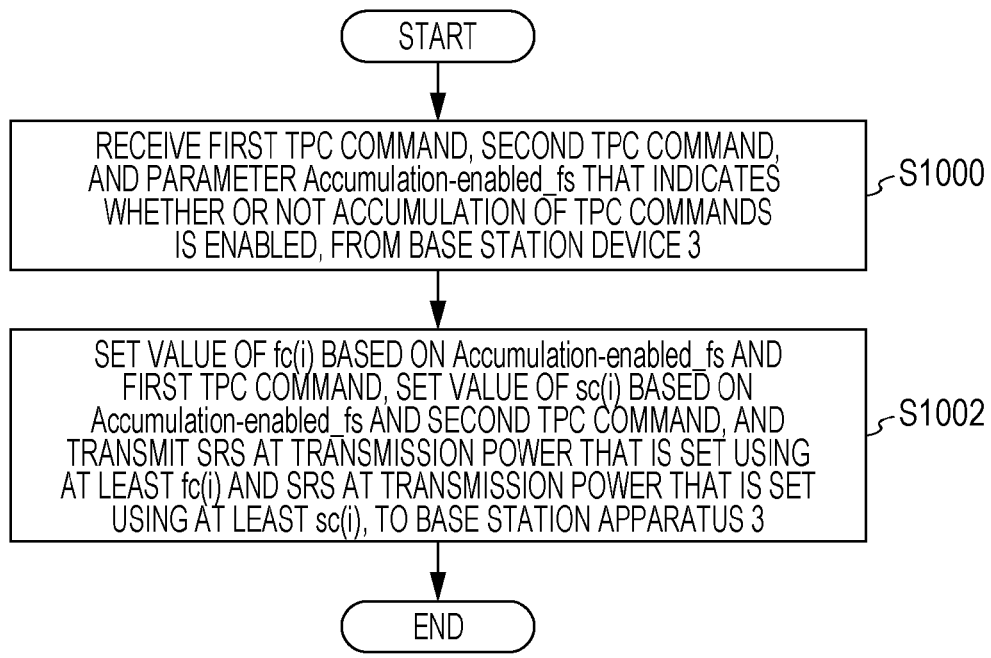

MOBILE STATION DEVICE, BASE STATION DEVICE, RADIO COMMUNICATION METHOD, AND INTEGRATED CIRCUIT

TECHNICAL FIELD

The present invention relates to a mobile station device, a base station device, a radio communication method, and an integrated circuit.

BACKGROUND ART

A radio access method and a radio network for cellular mobile communication (hereinafter referred to as "Long Term Evolution (LTE)", or "Evolved Universal Terrestrial Radio Access (EUTRA)") are under study in the 3rd Generation Partnership Project (3GPP). In LTE, an Orthogonal Frequency Division Multiplexing (OFDM) scheme is used as a downlink communication scheme. In LTE, a Single-Carrier Frequency Division Multiple Access (SC-FDMA) scheme is used as an uplink communication scheme. In LTE, a base station device is also referred to as evolved NodeB (eNodeB) and a mobile station device as user equipment (UE). LTE is a cellular communication system in which the area covered by the base station device is divided in a cellular pattern into multiple cells. A single base station device may manage multiple cells.

In LTE, the mobile station device transmits a sounding reference signal (SRS) to the base station device, and the base station device measures a channel state based on the received sounding reference signal. In LTE, the mobile station device periodically transmits an SRS based on a higher layer signal received from the base station device. The SRS that is periodically transmitted is referred to as a periodic SRS. In LTE, the mobile station device transmits an SRS only one time based on an SRS trigger received from the base station device. The SRS that is transmitted only one time is referred to as an aperiodic SRS.

In LTE, open loop parameters can be independently set for a transmission power control process for the periodic SRS and for a transmission power control process for the aperiodic SRS. Furthermore, in LTE, a shared TPC command is used for the transmission power control process for the periodic SRS and for the transmission power control process for the aperiodic SRS.

In 3GPP, it has been considered that for uplink coordinated communication (uplink coordinated multi-point transmission/reception), the mobile station device is configured to support multiple transmission power control processes for the aperiodic SRS (NPL 1 and NPL 2). Moreover, in a case where the mobile station device supports multiple transmission power control processes for the aperiodic SRS, it also has been considered that an open loop parameter and a TPC command should be independently set for each of the multiple transmission power control processes for the aperiodic SRS.

CITATION LIST

Non-Patent Literature

NPL 1: "SRS power control for UL CoMP", R1-122384, 3GPP TSG-RAN WG1 Meeting #69, Prague, Czech Republic, 21-25 May 2012.

NPL 2: "Way forward on SRS power control", R1-121859, 3GPP TSG-RAN WG1 Meeting #68bis, Jeju, Korea, 26-30 Mar. 2012.

DISCLOSURE OF THE INVENTION

Problems to be Solved by the Invention

However, for the mobile station device, technologies which deal with multiple transmission power control processes for the aperiodic SRS are not established sufficiently.

The present invention is made in view of the problem described above, and an object of the present invention is to provide a mobile station device, a base station device, a radio communication method, and an integrated circuit that are capable of efficiently setting a transmission power for an uplink signal.

Means for Solving the Problems (1) To accomplish the object, the present invention provides the following means. That is, a mobile station device according to the present invention is a mobile station device that communicates with a base station device, the mobile station device including: a reception unit that receives from the base station device a first transmission power control command, a second transmission power control command, first information indicating whether or not accumulation of the first transmission power control commands is enabled, and second information indicating whether or not accumulation of the second transmission power control commands is enabled; a transmission power setting unit that sets a first parameter value based on the first information and the first transmission power control command, sets a second parameter value based on the second information and the second transmission power control command, sets a first transmission power for a first reference signal using at least the first parameter, and sets a second transmission power for a second reference signal using at least the second parameter; and a transmission unit that transmits the first reference signal at the first transmission power and the second reference signal at the second transmission power to the base station device.

(2) Furthermore, a mobile station device according to the present invention is a mobile station device that communicates with a base station device, the mobile station device including: a reception unit that receives from the base station device a first transmission power control command, a second transmission power control command, and information indicating whether or not accumulation of the first transmission power commands and accumulation of the second transmission power control commands are enabled; a transmission power setting unit that sets a first parameter value based on the information and the first transmission power control command, sets a second parameter value based on the information and the second transmission power control command, sets a first transmission power for a first reference signal using at least the first parameter, and sets a second transmission power for a second reference signal using at least the second parameter; and a transmission unit that transmits the first reference signal at the first transmission power and the second reference signal at the second transmission power to the base station device.

(3) Furthermore, a mobile station device according to the present invention is a mobile station device that communicates with a base station device, the mobile station device including: a reception unit that receives from the base station device a first transmission power control command, a second transmission power control command, and information indicating whether or not accumulation of the transmission power commands is enabled; a transmission power setting unit that sets a first parameter value based on the information and the first transmission power control command, accumulates values of the second transmission power control commands regardless of the information, sets a second parameter to a value that results from the accumulation, sets a first transmission power for a first reference signal using at least the first parameter, and sets a second transmission power for a second reference signal using at least the second parameter; and a transmission unit that transmits the first reference signal at the first transmission power and the second reference signal at the second transmission power to the base station device.

(4) In the mobile station device according to the present invention, in a case where accumulation of the first transmission power control commands is enabled, the transmission power setting unit may accumulate values of the first transmission power control command and may set the first parameter to a value that results from the accumulation, and in a case where accumulation of the first transmission power control commands is disabled, the transmission power setting unit may set the first parameter to the value of the first transmission power control command.

(5) Furthermore, in the mobile station device according to the present invention, in a case where accumulation of the second transmission power control commands is enabled, the transmission power setting unit may accumulate values of the second transmission power control command and may set the second parameter to a value that results from the accumulation, and in a case where accumulation of the second transmission power control commands is disabled, the transmission power setting unit may set the second parameter to the value of the second transmission power control command.

(6) Furthermore, a radio communication method according to the present invention is a radio communication method for use in a mobile station device that communicates with a base station device, the method including receiving from the base station device a first transmission power control command, a second transmission power control command, first information indicating whether or not accumulation of the first transmission power control commands is enabled, and second information indicating whether or not accumulation of the second transmission power control commands is enabled. Furthermore, according to the present invention, the radio communication method includes setting a first parameter value based on the first information and the first transmission power control command, and setting a second parameter value based on the second information and the second transmission power control command. Furthermore, according to the present invention, the radio communication method includes setting a first transmission power for a first reference signal using at least the first parameter, a setting second transmission power for a second reference signal using at least the second parameter, and transmitting the first reference signal at the first transmission power and the second reference signal at the second transmission power to the base station device.

(7) Furthermore, a radio communication method is a radio communication method for use in a mobile station device that communicates with a base station device, the method including receiving from the base station device a first transmission power control command, a second transmission power control command, and information indicating whether or not accumulation of the first transmission power commands and accumulation of the second transmission power control commands are enabled. Furthermore, according to the present invention, the radio communication method includes setting a first parameter value based on the information and the first transmission power control command and setting a second parameter value based on the information and the second transmission power control command. Furthermore, according to the present invention, the radio communication method includes setting a first transmission power for a first reference signal using at least the first parameter, and setting a second transmission power for a second reference signal using at least the second parameter, and transmitting the first reference signal at the first transmission power and the second reference signal at the second transmission power to the base station device.

(8) Furthermore, a radio communication method according to the present invention is a radio communication method for use in a mobile station device that communicates with a base station device, the method including receiving from the base station device a first transmission power control command, a second transmission power control command, and information indicating whether or not accumulation of the transmission power commands is enabled. Furthermore, according to the present invention, the radio communication method includes setting a first parameter value based on the information and the first transmission power control command, accumulating values of the second transmission power control commands regardless of the information, and setting a second parameter to a value that results from the accumulation. Furthermore, according to the present invention, the radio communication method includes setting a first transmission power for a first reference signal using at least the first parameter, and setting a second transmission power for a second reference signal using at least the second parameter, and transmitting the first reference signal at the first transmission power and the second reference signal at the second transmission power to the base station device.

(9) Furthermore, an integrated circuit according to the present invention is an integrated circuit that is mounted in a mobile station device that communicates with a base station device, the circuit causing the mobile station device to perform a sequence of functions including: a function of receiving from the base station device a first transmission power control command, a second transmission power control command, first information indicating whether or not accumulation of the first transmission power control commands is enabled, and second information indicating whether or not accumulation of the second transmission power control commands is enabled; a function of setting a first parameter value based on the first information and the first transmission power control command; a function of setting a second parameter value based on the second information and the second transmission power control command; a function of setting a first transmission power for a first reference signal using at least the first parameter; a function of setting a second transmission power for a second reference signal using at least the second parameter; and a function of transmitting the first reference signal at the first transmission power and the second reference signal at the second transmission power to the base station device.

(10) Furthermore, an integrated circuit according to the present invention is an integrated circuit that is mounted in a mobile station device that communicates with a base station device, the circuit causing the mobile station device to perform a sequence of functions including: a function of receiving from the base station device a first transmission power control command, a second transmission power control command, and information indicating whether or not accumulation of the first transmission power commands and accumulation of the second transmission power control commands are enabled; a function of setting a first parameter value based on the information and the first transmission power control command; a function of setting a second parameter value based on the information and the second transmission power control command; a function of setting a first transmission power for a first reference signal using at least the first parameter; a function of setting a second transmission power for a second reference signal using at least the second parameter; and a function of transmitting the first reference signal at the first transmission power and the second reference signal at the second transmission power to the base station device.

(11) Furthermore, an integrated circuit according to the present invention is an integrated circuit that is mounted in a mobile station device that communicates with a base station device, the circuit causing the mobile station device to perform a sequence of functions including: a function of receiving from the base station device a first transmission power control command, a second transmission power control command, and information indicating whether or not accumulation of the transmission power commands is enabled; a function of setting a first parameter value based on the information and the first transmission power control command; a function of accumulating values of the second transmission power control commands regardless of the information; a function of setting a second parameter to a value that results from the accumulation; a function of setting a first transmission power for a first reference signal using at least the first parameter; a function of setting a second transmission power for a second reference signal using at least the second parameter; and a function of transmitting the first reference signal at the first transmission power and the second reference signal at the second transmission power to the base station device.

(12) Furthermore, a base station device according to the present invention is a base station device that communicates with a mobile station device, the base station device including: a transmission unit that transmits to the mobile station device a first transmission power control command, a second transmission power control command, first information indicating whether or not accumulation of the first transmission power control commands is enabled, and second information indicating whether or not accumulation of the second transmission power control commands is enabled; and a reception unit that receives from the mobile station device a first reference signal at a first transmission power that is set using at least a first parameter and a second reference signal at a second transmission power that is set using at least a second parameter, in which a first parameter value is set based on the first information and the first transmission power control command, and in which a second parameter value is set based on the second information and the second transmission power control command.

(13) Furthermore, a base station device according to the present invention is a base station device that communicates with a mobile station device, the base station device including: a transmission unit that transmits to the mobile station device a first transmission power control command, a second transmission power control command, and information indicating whether or not accumulation of the first transmission power control commands and accumulation of the second transmission power control commands are enabled; and a reception unit that receives from the mobile station device a first reference signal at a first transmission power that is set using at least a first parameter and a second reference signal at a second transmission power that is set using at least a second parameter, in which a first parameter value is set based on the information and the first transmission power control command, and in which a second parameter value is set based on the information and the second transmission power control command.

(14) Furthermore, a base station device according to the present invention is a base station device that communicates with a mobile station device, the base station device including: a transmission unit that transmits to the mobile station device a first transmission power control command, a second transmission power control command, and information indicating whether or not accumulation of the transmission power control commands is enabled; and a reception unit that receives from the mobile station device a first reference signal at a first transmission power that is set using at least a first parameter and a second reference signal at a second transmission power that is set using at least a second parameter, in which a first parameter value is set based on the information and the first transmission power control command, and in which values of the second transmission control commands are accumulated regardless of the information and the second parameter is set to a value that results from the accumulation.

(15) Furthermore, a base station device according to the present invention is a radio communication method for use in a base station device that communicates with a mobile station device, the base station device including transmitting to the mobile station device a first transmission power control command, a second transmission power control command, first information indicating whether or not accumulation of the first transmission power control commands is enabled, and second information indicating whether or not accumulation of the second transmission power control commands is enabled. Furthermore, according to the present invention, the base station device includes receiving from the mobile station device a first reference signal at a first transmission power that is set using at least a first parameter and a second reference signal at a second transmission power that is set using at least a second parameter. Furthermore, according to the present invention, in the base station device, a first parameter value may be set based on the first information and the first transmission power control command, and a second parameter value may be set based on the second information and the second transmission power control command.

(16) Furthermore, a radio communication method according to the present invention is a radio communication method for use in a base station device that communicates with a mobile station device, the method including transmitting to the mobile station device a first transmission power control command, a second transmission power control command, and information indicating whether or not accumulation of the first transmission power control commands and accumulation of the second transmission power control commands are enabled. Furthermore, according to the present invention, the radio communication method includes receiving from the mobile station device a first reference signal at a first transmission power that is set using at least a first parameter and a second reference signal at a second transmission power that is set using at least a second parameter. Furthermore, according to the present invention, in the radio communication method, a first parameter value may be set based on the information and the first transmission power control command, and a second parameter value may be set based on the information and the second transmission power control command.

(17) Furthermore, a radio communication method according to the present invention is a radio communication method for use in a base station device that communicates with a mobile station device, the method including transmitting to the mobile station device a first transmission power control command, a second transmission power control command, and information indicating whether or not accumulation of the transmission power control commands is enabled. Furthermore, according to the present invention, the radio communication method includes receiving from the mobile station device a first reference signal at a first transmission power that is set using at least a first parameter and a second reference signal at a second transmission power that is set using at least a second parameter. Furthermore, according to the present invention, in the radio communication method, a first parameter value may be set based on the information and the first transmission power control command, and values of the second transmission power control commands may be accumulated regardless of the information and the second parameter may be set to a value that results from the accumulation.

Effects of the Invention

According to the present invention, the mobile station device efficiently sets the transmission power for the uplink signal.

BRIEF DESCRIPTION OF THE DRAWINGS

FIG. 9 is a diagram illustrating one example of operation of the base station device 3 according to a second embodiment.
FIG. 10 is a diagram illustrating one example of operation of the mobile station device 1 according to the second embodiment.

MODE FOR CARRYING OUT THE INVENTION

Embodiments of the present invention will be described below.

According to the present embodiment, a mobile station device communicates with a single cell. However, the present invention may be applied to a case where the mobile station device communicates with multiple cells. A technology in which the mobile station device communicates with multiple cells is referred to as a cell aggregation or a carrier aggregation. The present invention may be applied to cell aggregation in all of multiple cells. Furthermore, the present invention may be applied to cell aggregation in some of multiple cells.

According to the present embodiment, a Frequency Division Duplex (FDD) scheme is applied. However, the present invention can be applied also to a radio communication system in compliance with a Time Division Duplex (TDD) scheme. Furthermore, the present invention can be applied also to a radio communication system in which a cell using the TDD scheme and a cell using the FDD scheme perform communication at the same time.

Figure 1:
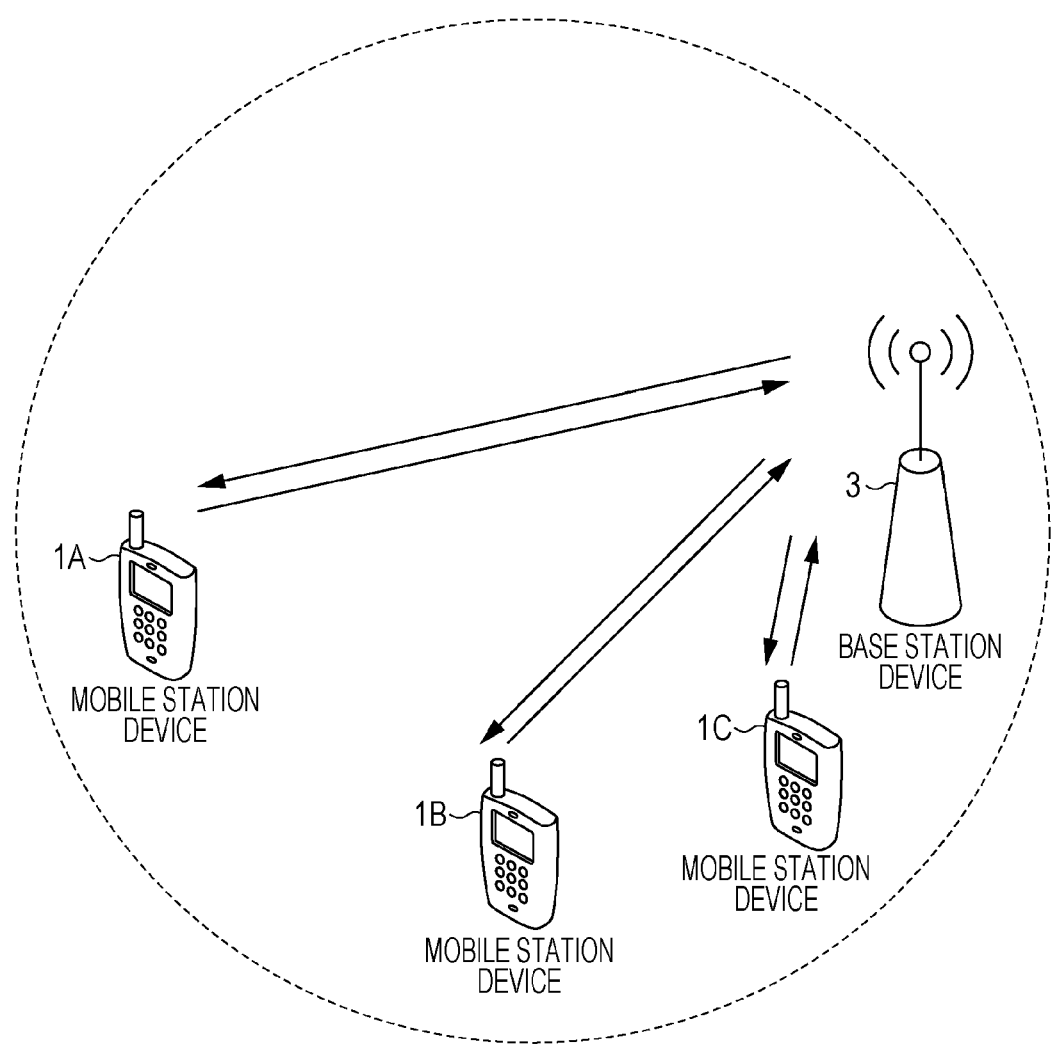
FIG. 1 is a schematic diagram of a radio communication system according to the present embodiment.

FIG. 1 is a diagram of the radio communication system according to the present embodiment. In FIG. 1, the radio communication system includes mobile station devices 1A to 1C and a base station device 3. The mobile station devices 1A to 1C are hereinafter referred to as a mobile station device 1.

A physical channel and physical signal according to the present embodiment will be described below.

In FIG. 1, the following uplink physical channels are used in uplink radio communication from the mobile station device 1 to the base station device 3. The uplink physical channel is used to transmit information that is output from a higher layer.
Physical Uplink Control Channel (PUCCH)
Physical Uplink Shared Channel (PUSCH)
Physical Random Access Channel (PRACH)
The PUCCH is a physical channel that is used to transmit uplink control information (UCI).
The PUSCH is a physical channel that is used to transmit uplink data (Uplink-Shared Channel (UL-SCH)). The PUSCH may be used to transmit the uplink control information along with the uplink data. The PUSCH may be used to transmit only uplink control information.
The PRACH is a physical channel that is used to transmit a random access preamble. The PRACH is mainly used in order for the mobile station device 1 to be synchronized to the base station device 3 in terms of a time domain.

In FIG. 1, the following uplink physical signal is used in the uplink radio communication. The uplink physical signal is not used to transmit the information that is output from the higher layer, but is used by a physical layer.
Uplink Reference Signal (UL RS)
According to the present embodiment, two types of uplink reference signals that are used are as follows.
Demodulation Reference Signal (DMRS)
Sounding Reference Signal (SRS)
A DMRS is associated with PUSCH or PUCCH communication. A DMRS is time-multiplexed along with the PUSCH or the PUCCH. The base station device 3 uses a DMRS in order to perform channel reconfiguration on the PUSCH or the PUCCH. Transmission of the PUSCH along with the DMRS is hereinafter simply referred to as transmission of the PUSCH. Transmission of the PUCCH along with the DMRS is hereinafter simply referred to as transmission of the PUCCH.

An SRS has no relationship with the PUSCH or PUCCH transmission. The base station device 3 uses an SRS in order to measure an uplink channel state. A symbol in which an SRS is transmitted is also referred to as a sounding reference symbol. An SRS will be described in detail below.

In FIG. 1, the following downlink physical channels are used in downlink radio communication from the base station device 3 to the mobile station device 1. The downlink physical channels are used to transmit the information that is output from the higher layer.
Physical Broadcast Channel (PBCH)
Physical Control Format Indicator Channel (PCFICH)
Physical Hybrid automatic repeat request Indicator Channel (PHICH)
Physical Downlink Control Channel (PDCCH)
enhanced Physical Downlink Control Channel (ePDCCH)
Physical Downlink Shared Channel (PDSCH)
The PBCH is used to broadcast system information (master information block or broadcast channel (BCH)) that is commonly used in mobile station devices 1. The PBCH is transmitted at intervals of 40 ms. Timings at intervals of 40 ms are blind-detected in the mobile station device 1. Furthermore, the PBCH is retransmitted at intervals of 10 ms.

The PCFICH is used to transmit information indicating a domain (OFDM symbol) that is reserved for transmission of the PDCCH.

The PHICH is used to transmit a HARQ indicator (HARQ feedback or response information) indicating an acknowledgement (ACK) of or a negative acknowledgement (NACK) of the uplink data (Uplink Shared Channel: UL-SCH) received by the base station device 3. For example, in a case where the mobile station device 1 receives the HARQ indicator indicating ACK, the corresponding uplink data is not retransmitted. For example, in a case where the mobile station device 1 receives the HARQ indicator indicating NACK, the corresponding uplink data is retransmitted.

The PDCCH and the ePDCCH are used to transmit downlink control information (DCI). The downlink control information is also referred to as a DCI format. The downlink control information includes a downlink grant (or also referred to as downlink assignment) and an uplink grant. The downlink grant is downlink control information that is used in scheduling of a single PDSCH within a single cell. The downlink grant is used in scheduling of the PDSCH within the subframe that is the same as one in which the downlink grant is transmitted. The uplink grant is downlink control information that is used in the scheduling of a single PUSCH with a single cell. The uplink grant is used in scheduling of a single PUSCH within the fourth or later subframe following a subframe in which the uplink grant is transmitted.

A transmission power control (TPC) command is included in the downlink grant and the uplink grant. Furthermore, a DCI format 3 including multiple TPC commands to multiple mobile station devices is defined.

The PDSCH is used to transmit downlink data (Downlink Shared Channel (DL-SCH)).

In FIG. 1, the following downlink physical signal is used in the downlink radio communication. The downlink physical signal is not used to transmit the information that is output from the higher layer, but is used by the physical layer.

Synchronization Signal (SS)

Downlink Reference Signal (DL RS)

The synchronization signal is used in order for the mobile station device 1 to be synchronized in terms of a downlink frequency domain and time domain.

The downlink reference signal is used in order for the mobile station device 1 to perform the channel reconfiguration of the downlink physical channel. The downlink reference signal is used in order for the mobile station device 1 to calculate downlink channel state information.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the UL-SCH, and the DL-SCH are transport channels. A channel that is used in a medium access control (MAC) layer is referred to as a transport channel.

A configuration of a radio frame according to the present embodiment will be described below.

Figure 2:
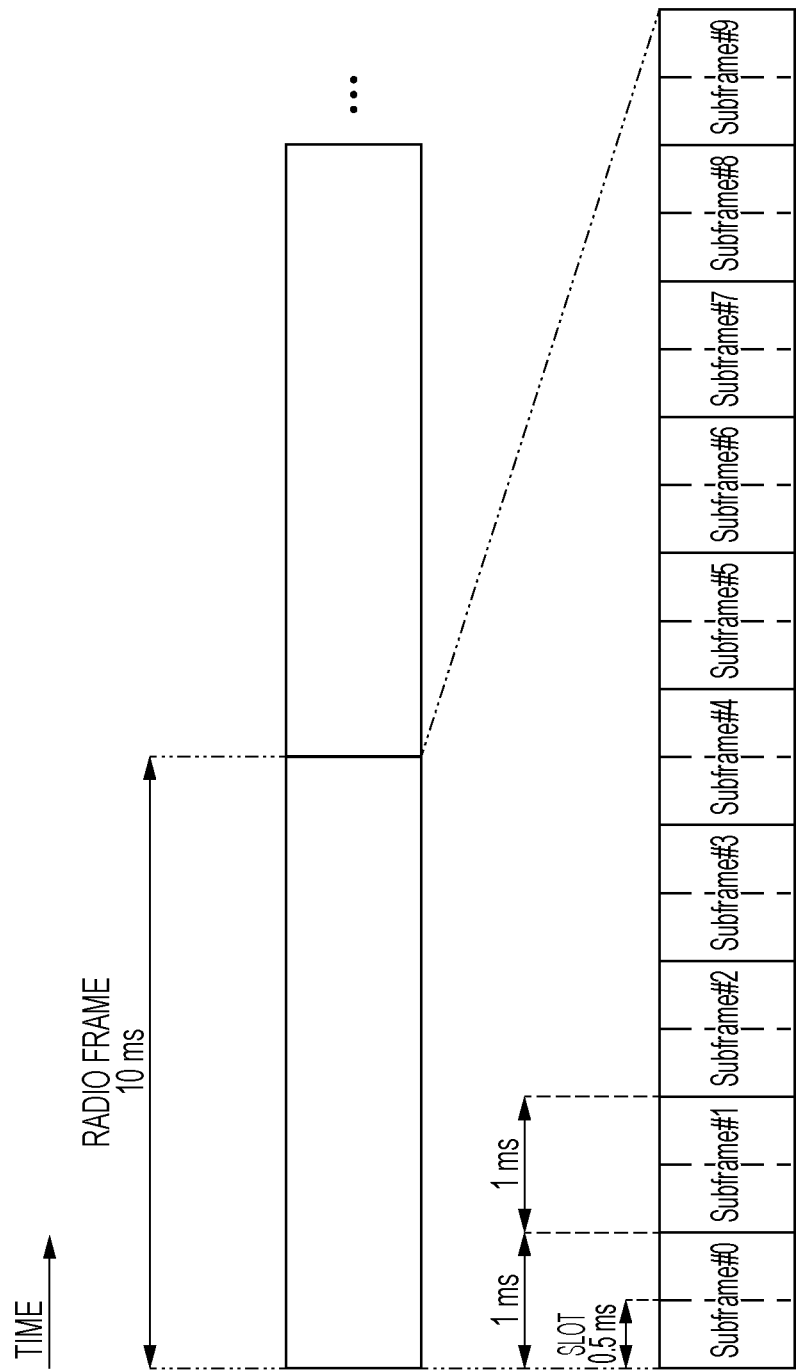
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms long. Furthermore, each of the radio frames is configured from two half frames. Each of the half frames is 5 ms long. Each of the half frames is configured from 5 subframes. Each of the subframes is 1 ms long, and is defined by two consecutive slots. An i-th subframe within the radio frame is configured from a (2×i)-th slot and a (2×i+1)-th slot. To be more precise, 10 subframes can be used in intervals of 10 ms. Each of the slots is 0.5 ms long.

A configuration of the slot according to the present embodiment will be described below.

Figure 3:
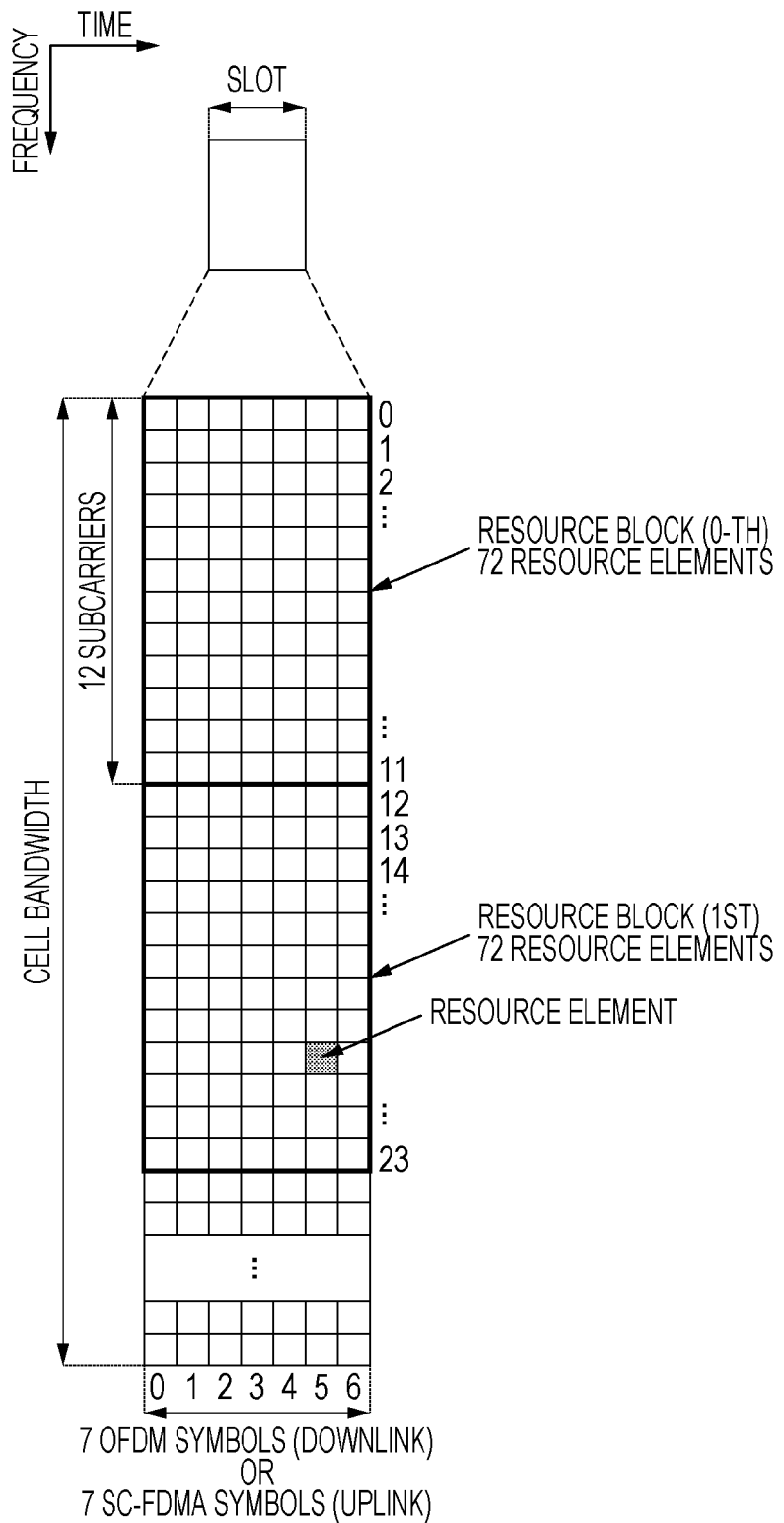
FIG. 3 is a diagram illustrating a configuration of a slot according to the present embodiment.

FIG. 3 is a diagram illustrating the configuration of the slot according to the present embodiment. The physical signal or physical channel that is transmitted in each of the slots is expressed by a resource grid. In downlink, the resource grid is defined by multiple subcarriers and multiple OFDM symbols. In uplink, the resource grid is defined by multiple subcarriers and multiple SC-FDMA symbols. The number of subcarriers that make up one slot depends on a cell bandwidth. The number of OFDM symbols or SC-FDMA symbols that make up one slot is 7. Each of the elements within the resource grid is referred to as a resource element. The resource element is identified using a subcarrier number, and an OFDM symbol or SC-FDMA symbol number.

A resource block is used to express mapping of a certain physical channel (the PDSCH, the PUSCH, or the like) onto elements. The resource block is defined by a virtual resource block and a physical resource block. A certain physical channel is first mapped onto the virtual resource block. Thereafter, the virtual resource block is mapped onto the physical resource block. One physical resource block is defined by 7 consecutive OFDM symbols or SC-FDMA symbols in the time domain and by 12 consecutive subcarriers in the frequency domain. Therefore, one physical resource block is configured from (7×12) resource elements. Furthermore, one physical resource block corresponds to one slot in the time domain, and corresponds to 180 kHz in the frequency domain. The physical resource block is numbered from 0 in the frequency domain.

An arrangement of the physical channels and the physical signals that are transmitted in an uplink subframe will be described below.

Figure 4:
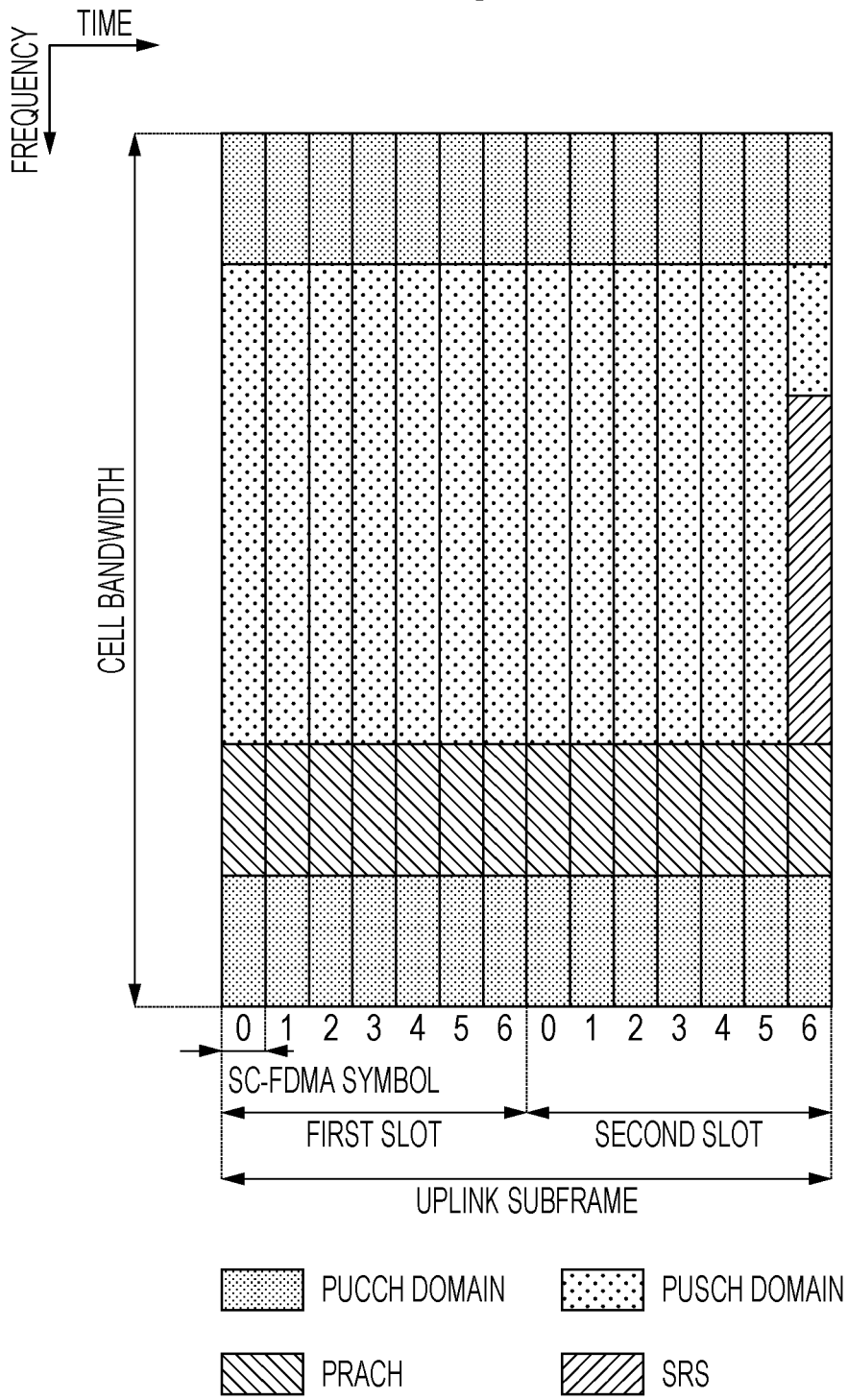
FIG. 4 is a diagram illustrating one example of an arrangement of physical channels and physical signals in an uplink subframe according to the present embodiment.

FIG. 4 is a diagram illustrating one example of the arrangement of the physical channels and the physical signals in the uplink subframe according to the present embodiment. The mobile station device 1 can transmit the uplink physical channels (the PUCCH, the PUSCH, and the PRACH), and the uplink physical signals (the DMRS and the SRS) in the uplink subframe.

In a PUCCH domain, the multiple PUCCHs that are transmitted by the multiple mobile station devices 1 are frequency-, time-, and code-multiplexed. A single mobile station device 1 can transmit one PUCCH in a single uplink subframe. In a PUSCH domain, the multiple PUSCHs are frequency- and space-multiplexed. A single mobile station device 1 can transmit a single PUSCH in a single uplink subframe in a single cell. The PUCCH and the PUSCH are frequency-multiplexed. A single mobile station device 1 can transmit a single PUSCH and a single PUCCH at the same time in a single uplink subframe in a single cell. The PRACH is arranged over a single subframe or two subframes. Furthermore, the multiple PRACHs are code-multiplexed. A single mobile station device 1 does not transmit a single PRACH and a different uplink signal at the same time in a single cell.

An SRS is transmitted using the last SC-FDMA symbol within the uplink subframe. To be more precise, the SRS is arranged in the last SC-FDMA symbol with the uplink subframe. It is difficult for the mobile station device 1 to transmit the SRS and the PUCCH/PUSCH/PRACH at the same time in a single SC-FDMA symbol in a single cell. In a single uplink subframe in a single cell, the mobile station device 1 can transmit the PUSCH and/or the PUCCH using the SC-FDMA symbol with the last SC-FDMA symbol within the uplink subframe being excluded, and can transmit the SRS using the last SC-FDMA symbol within the uplink subframe. To be more precise, in a single uplink subframe in a single cell, the mobile station device 1 can transmit the SRS and the PUSCH/PUCCH at the same time. Moreover, the DMRS and the PUCCH or the PUSCH are time-multiplexed. For brief description, the DMRS is not illustrated in FIG. 5.

The SRS according to the present embodiment will be described below.

The mobile station device 1 transmits an SRS based on two trigger types. The two trigger types are a trigger type 0 and a trigger type 1. The SRS that is transmitted based on the trigger type 0 is referred to as a periodic SRS or a trigger type 0 SRS. The SRS that is transmitted based on the trigger type 1 is referred to as an aperiodic SRS or a trigger type 1 SRS.

Based on a higher layer signal, the mobile station device 1 transmits the periodic SRS in a first resource that is set by a higher layer. In a case where information indicating a request for transmission of the SRS that is included in the DCI format is received, the mobile station device 1 transmits the aperiodic SRS only one time in a second resource that is set by a higher layer. The information indicating whether or not the transmission of SRS is requested is referred to as an SRS request or an SRS request bit.

The aperiodic SRS corresponding to a first SRS transmission power control process is referred to as a first aperiodic SRS or a trigger type 1a SRS. The aperiodic SRS corresponding to a second SRS transmission power control process is referred to as a second aperiodic SRS or a trigger type 1b SRS. A request for the transmission of the first aperiodic SRS with the trigger type 1 is referred to as a trigger type 1a, and a request for the transmission of the second aperiodic SRS with the trigger type 1 is referred to as a trigger type 1b.

Moreover, a trigger type x (0, 1a, 1b) SRS and a trigger type (0, 1a, 1b) SRS are collectively referred to as a trigger type x/y SRS. Moreover, multiple SRSs are not transmitted in a single SC-FDMA symbol in a single cell. To be more precise, the mobile station device 1 can transmit a single SRS in a single SC-FDMA symbol in a single cell.

According to the present embodiment, three types of SRS request are used. A type 1a SRS request indicates whether or not the transmission of the trigger type 1a SRS is requested. A type 1b SRS request indicates whether or not the transmission of the trigger type 1b SRS is requested. A type 1 SRS request indicates whether the transmission of a trigger type 1a SRS is requested, whether the transmission of a type 1b SRS is requested, or whether neither the transmission of a type 1a SRS nor a type 1b SRS is requested.

A single SRS request may be included in a single DCI format. Multiple SRS requests may be included in a single DCI format. For example, the type 1a SRS request and the type 1b SRS request may be included in a single DCI format. The mobile station device 1 may receive multiple pieces of downlink control information that includes an SRS request, at the same time.

A device configuration according to the present embodiment will be described below.

Figure 5:
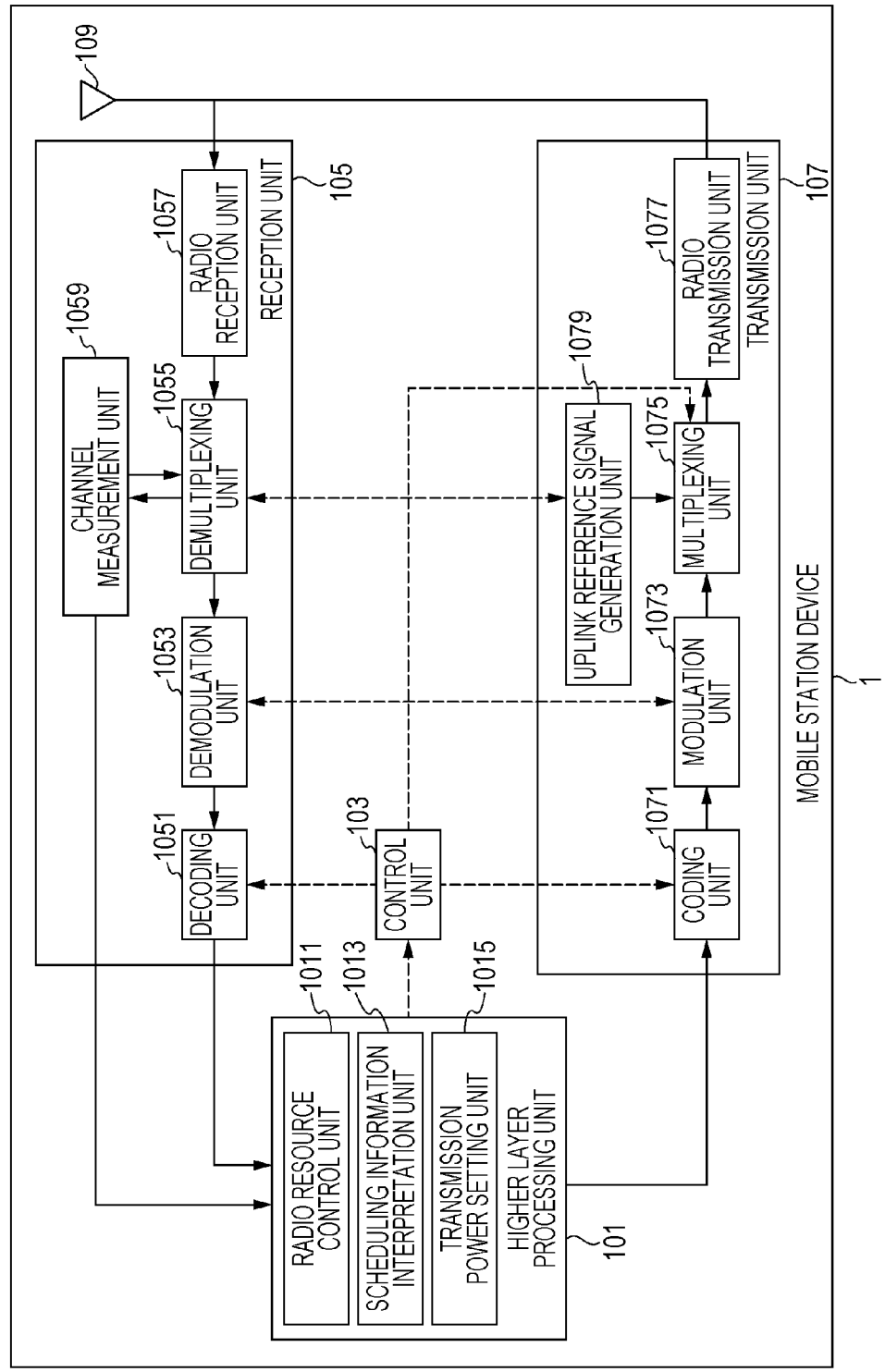
FIG. 5 is a schematic block diagram illustrating a configuration of a mobile station device 1 according to the present embodiment.

FIG. 5 is a schematic block diagram illustrating a configuration of the mobile station device 1 according to the present embodiment. As illustrated, the mobile station device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a scheduling information interpretation unit 1013, and a subframe setting unit 1015. Furthermore, the reception unit 105 is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs to the transmission unit 107 the uplink data (transport block) generated by a user operation and the like. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that the higher layer processing unit 101 includes performs management of various pieces of setting information of the mobile station device 1 itself. Furthermore, the radio resource control unit 1011 generates information that is arranged in each channel for uplink, and outputs the generated information to the transmission unit 107.

The scheduling information interpretation unit 1013 that the higher layer processing unit 101 includes interprets information that is used in scheduling of the physical channel (the PUSCH, the PDSCH, or the like) received through the reception unit 105, generates control information for performing control of the reception unit 105 and of the transmission unit 107 based on a result of interpreting the information, and outputs the generated control information to the control unit 103.

The transmission power setting unit 1015 that the higher layer processing unit 101 includes sets a transmission power for uplink signal (SRS) transmission. A method of setting the transmission power for SRS transmission will be described in detail below.

Based on the control information from the higher layer processing unit 101, the control unit 103 generates a control signal for performing control of the reception unit 105 and of the transmission unit 107. The control unit 103 outputs the generated control signal to the reception unit 105 and the transmission unit 107, and thus performs control of the reception unit 105 and of the transmission unit 107.

In accordance with the control signal that is input from the control unit 103, the reception unit 105 demultiplexes, demodulates, and decodes a received signal that is received from the base station device 3 through the transmit and receive antenna 109, and outputs the resulting information to the higher layer processing unit 101.

The radio reception unit 1057 converts (down-converts) a downlink signal received through the transmit and receive antenna 109 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion equivalent to a guide interval (GI) from the digital signal that results from the conversion, performs fast Fourier Transform (FFT) on the signal from which the guide interval is removed, and extracts a signal in the frequency domain.

The demultiplexing unit 1055 demultiplexes the extracted signal into the PHICH, the PDCCH, the ePDCCH, the PDSCH, and the downlink reference signal. Furthermore, the demultiplexing unit 1055 makes an adjustment of channels, the PHICH, the PDCCH, the ePDCCH, and the PDSCH, from a channel estimate being input from the channel measurement unit 1059. Furthermore, the demultiplexing unit 1055 outputs the demultiplexed downlink reference signal to the channel measurement unit 1059.

The demodulation unit 1053 multiplies the PHICH by a corresponding code for composition, performs demodulation in compliance with the Binary Phase Shift Keying (BPSK) modulation scheme on the resulting composite signal, and outputs a result of the demodulation to the decoding unit 1051. The decoding unit 1051 decodes the PHICH destined for the mobile station device 1 itself, and outputs to the higher layer processing unit 101 the HARQ indicator that results from the decoding. The demodulation unit 1053 performs the demodulation in compliance with a modulation scheme such as QPSK on the PDCCH and/or the ePDCCH and outputs a result of the demodulation to the decoding unit 1051. The decoding unit 1051 attempts to perform window shadow decoding of the PDCCH and/or the ePDCCH. In a case where the window shadow decoding succeeds, the decoding unit 1051 outputs to the higher layer processing unit 101 the downlink control information that results from the decoding and RNTI that is included in the downlink control information.

The demodulation unit 1053 performs the demodulation on the PDSCH in compliance with the modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 performs the decoding based on information relating to a coding rate that is notified with the downlink control information, and outputs to the higher layer processing unit 101 the downlink data (transport block) that results from the decoding.

The channel measurement unit 1059 measures a downlink path loss or a channel state from the downlink reference signal being input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055.

The transmission unit 107 generates the uplink reference signal in accordance with the control signal being input from the control unit 103, performs the coding and the modulation on the uplink data (transport block) being input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 performs the coding, such as convolutional coding and block coding, on the uplink control information being input from the higher layer processing unit 101. Furthermore, the coding unit 1071 performs turbo coding, based on information that is used in the scheduling of the PUSCH.

The modulation unit 1073 performs the modulation on coded bits being input from the coding unit 1071, in compliance with the modulation scheme notified with the downlink control information, such as BPSK, QPSK, 16 QAM, or 64 QAM, or the modulation scheme that is prescribed in advance on every channel. Based on the information that is used in the scheduling of the PUSCH, the modulation unit 1073 determines the number of sequences of pieces of data that are space-multiplexed, maps onto multiple sequences the multiple pieces of uplink data that are transmitted on the same PUSCH by using Multiple Input Multiple Output Spatial Multiplexing (MIMO SM), and performs precoding on the sequences.

The uplink reference signal generation unit 1079 generates a sequence that is acquired according to a predetermined rule (formula), based on a physical cell identity (PCI) (also referred to as a Cell ID) for identifying the base station device 3, a bandwidth in which the uplink reference signal is arranged, a cyclic shift that is notified with the uplink grant, a parameter value for generation of a DMRS sequence, and the like. In accordance with the control signal being input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for every transmit antenna port. To be more precise, the multiplexing unit 1075 arranges the PUCCH and PUSCH signals and the generated uplink reference signal in the resource elements for every transmit antenna port.

The radio transmission unit 1077 performs Inverse Fast Fourier Transform (IFFT) on the multiplexed signal, performs the modulation in compliance with an SC-FDMA scheme, generates an SC-FDMA symbol, appends the guide interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 109 for transmission.

Figure 6:
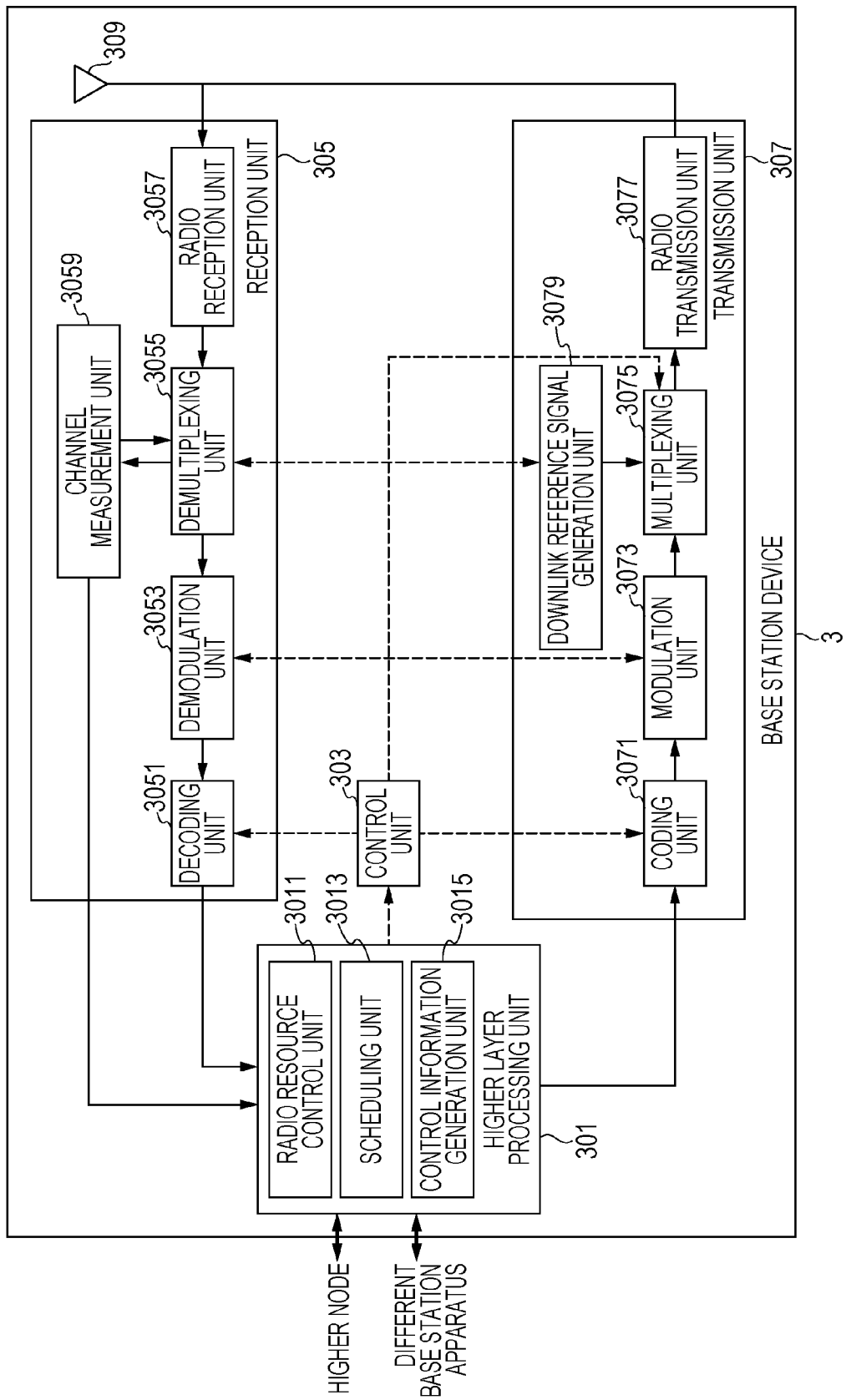
FIG. 6 is a schematic block diagram illustrating a configuration of a base station device 3 according to the present embodiment.

FIG. 6 is a schematic block diagram illustrating a configuration of the base station device 3 according to the present embodiment. As illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a scheduling unit 3013, and a control information generation unit 3015. Furthermore, the reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal for performing control of the reception unit 305 and of the transmission unit 307 and outputs the generated control information to the control unit 303.

The radio resource control unit 3011 that the higher layer processing unit 301 includes generates, or acquires from a higher level node, the downlink data (transport block) that is arranged in the downlink PDSCH, an RRC signal, a MAC CE (control element), and the like, and outputs a result of the generation or of the acquirement to the transmission unit 307.

Furthermore, the radio resource control unit 3011 manages various pieces of setting information of each of the mobile station devices 1.

The scheduling unit 3013 that the higher layer processing unit 301 includes determines a frequency and a subframe in which the physical channel (the PDSCH and the PUSCH) is allocated, the coding rate and modulation scheme of the physical channel (the PDSCH and the PUSCH), the transmission power, and the like, from a channel estimate, channel quality, or the like that is input from the channel measurement unit 3059. The scheduling unit 3013 determines whether, in a flexible subframe, the downlink physical channel and/or the downlink physical signal is scheduled or the uplink physical channel and/or the uplink physical signal is scheduled. The scheduling unit 3013 generates the control information in order to perform the control of the reception unit 305 and of the transmission unit 307 based on a result of the scheduling, and outputs the generated information to the control unit 303. Furthermore, the scheduling unit 3013 outputs a result of the scheduling of the physical channel (the PDSCH and the PUSCH) to the control information generation unit 3015.

Based on the result scheduling, which is input from the scheduling unit 3013, the control information generation unit 3015 generates information that is used in scheduling of the physical channel (the PDSCH and the PUSCH) and the physical signal (SRS) and information/parameters that are used in the transmission power control of the uplink signal (SRS). Furthermore, the control information generation unit 3015 generates first information, second information, third information, fourth information, fifth information, sixth information, and/or the like. Furthermore, the control information generation unit 3015 outputs the generated information to the transmission unit 307.

The control unit 303 generates the control signal for performing the control of the reception unit 305 and of the transmission unit 307, based on the control information from the higher layer processing unit 301. The control unit 303 outputs the generated control signal to the reception unit 305 and the transmission unit 307, and thus performs control of the reception unit 305 and of the transmission unit 307.

In accordance with the control signal that is input from the control unit 303, the reception unit 305 demultiplexes, demodulates, and decodes a received signal that is received from the mobile station device 1 through the transmit and receive antenna 309, and outputs the resulting information to the higher layer processing unit 301. The radio reception unit 3057 converts (down-converts) an uplink signal received through the transmit and receive antenna 309 into an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the guide interval (GI) from the digital signal that results from the conversion. The radio reception unit 3057 performs Fast Fourier Transform (FFT) on the signal from which the guide interval is removed, and outputs the resulting signal to the demultiplexing unit 3055 that extracts the signal in the frequency domain.

The demultiplexing unit 3055 demultiplexes the signal being input from the radio reception unit 3057 into the PUCCH, the PUSCH, and the signal such as the uplink reference signal. Moreover, the demultiplexing is performed based on radio resource allocation information that is determined in advance in the radio resource control unit 3011 by the base station device 3, and that is included in the uplink grant notified to each mobile station device 1. Furthermore, the demultiplexing unit 3055 makes an adjustment of channels, the PUCCH and the PUSCH, from the channel estimate being input from the channel measurement unit 3059. Furthermore, the demultiplexing unit 3055 outputs the demultiplexed uplink reference signal to the channel measurement unit 3059.

The demodulation unit 3053 performs Inverse Discrete Fourier Transform (IDFT) on the PUSCH, acquires the modulation symbol, and performs the demodulation of the received signal with respect to each of the modulation symbols of the PUCCH and the PUSCH, using the modulation scheme prescribed in advance, such as Binary Phase Shift Keying (BPSK), QPSK, 16 QAM, or 64 QAM, or the modulation scheme that the base station device 3 itself notifies, in advance with the uplink grant, to each of the mobile station devices 1. The demodulation unit 3053 demultiplexes the modulation symbol of the multiple pieces of uplink data that are transmitted on the same PUSCH by using MIMO SM, based on the number of sequences that is notified in advance with the uplink grant to each of the mobile station devices 1 and on information indicating the precoding that is performed on the sequences.

The decoding unit 3051 performs the decoding on the demodulated coded bits of the PUCCH and the PUSCH at the coding rate in compliance with a coding scheme prescribed in advance, which is prescribed in advance, or is notified in advance with the uplink grant to the mobile station device 1 by the base station device 3 itself, and outputs to the higher layer processing unit 101 the uplink data and the uplink control information that are decoded. In a case where the PUSCH is retransmitted, the decoding unit 3051 performs the decoding using the coded bits that are input from the higher layer processing unit 301 and that are retained in a HARQ buffer, and the demodulated coded bits. The channel measurement unit 309 measures the channel estimate or the channel quality, and the like, based on the uplink reference signal being input from the demultiplexing unit 3055, and outputs a result of the measurement to the demultiplexing unit 3055 and the higher layer processing unit 301.

The transmission unit 307 generates the downlink reference signal in accordance with the control signal being input from the control unit 303, codes and modulates the HARQ indicator, the downlink control information, and the downlink data that are input from the higher layer processing unit 301, multiplexes the PHICH, the PDCCH, the ePDCCH, the PDSCH, and the downlink reference signal, and transmits a signal to the mobile station device 1 through the transmit and receive antenna 309.

The coding unit 3071 performs the coding on the HARQ indicator, the downlink control information, and the downlink data that are input from the higher layer processing unit 301. When performing the coding, the coding unit 3071 uses the coding scheme that is prescribed in advance, such as block coding, convolutional coding, or turbo coding, or the coding scheme that is determined by the radio resource control unit 3011. The modulation unit 3073 performs the modulation on the coded bits being input from the coding unit 3071. When performing the modulation, the modulation unit 3073 uses the modulation scheme that is prescribed in advance, such as BPSK, QPSK, 16 QAM, or 64 QAM, or the modulation scheme that is determined by the radio resource control unit 3011.

The downlink reference signal generation unit 3079 generates as the downlink reference signal a sequence that is already known to the mobile station device 1, which is acquired according to a rule that is determined in advance based on the physical cell identity (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal in the resource elements.

The radio transmission unit 3077 performs Inverse Fast Fourier Transform (IFFT) on the multiplexed modulation symbol, performs the modulation in compliance with an OFDM scheme, generates an OFDM symbol, appends the guide interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a high frequency signal, removes unnecessary frequency components, performs power amplification, and outputs a final result to the transmit and receive antenna 309 for transmission.

A method of setting a transmission power of an SRS according to first to third embodiments will be described.

A first embodiment of the present invention will be described below.

According to the first embodiment, the mobile station device 1 sets the transmission power for the SRS that is transmitted with a subframe i for a cell c, based in Equation (1). The transmission power for each of the trigger type 0 SRS, the trigger type 1a SRS, and the trigger type 1b SRS each are set based on Equation (1). In Equation (1), for each of the trigger type 0 SRS, the trigger type 1a SRS, and the trigger type 1b SRS, the transmission power is set based on at least one different parameter. To be more precise, for each of the trigger type 0 SRS, the trigger type 1a SRS, and the trigger type 1b SRS, the transmission power is set by a different transmission power control process.

$$P_{SRS,c}(i) = \min \begin{Bmatrix} P_{CMAX,c}(i), P_{SRS\_OFFSET,c}(m) + \\ 10\log_{10}(M_{SRS,c}) + P_{O\_PUSCH,c}(j) + \\ \alpha_c(j) \cdot PL_c + \Delta_{TPC,c}(m,i) \end{Bmatrix} [dBm] \quad \text{Equation (1)}$$

$P_{CMAX,c}(i)$ is a maximum transmission power and is a transmission power that is set in the subframe i for the cell c.

$P_{SRS\_OFFSET,c}(m)$ is a parameter that is semi-statically set by a higher layer for the cell c. In the case of the trigger type 0 SRS, m is 0. In the case of the trigger type 1a SRS, m is 1. In the case of the trigger type 1b SRS, m is 2. $P_{SRS\_OFFSET,c}(0)$, $P_{SRS\_OFFSET,c}(1)$, and $P_{SRS\_OFFSET,c}(2)$ are independent of one another.

$M_{SRS,c}$ is a bandwidth for the SRS transmission in the subframe i for the cell c, and is expressed by the number of resource blocks. The base station device 3 determines the bandwidth for the SRS transmission, and notifies the mobile station device 1 of the determined bandwidth. The bandwidth for the SRS of a different trigger type is independent. Furthermore, the base station device 3 may set multiple bandwidths for the trigger type 1 SRS. In this case, when the transmission of the trigger type 1 SRS is requested, it is desirable that the base station device 3 should notify which one of the multiple bandwidths being set is used.

$P_{O\_PUSCH,c}(j)$ and $\alpha_c(j)$ are parameters for setting the transmission power for PUSCH transmission, and j is 1. $P_{O\_PUSCH,c}(1)$ and $\alpha_c(1)$ are used to set the transmission power for the PUSCH transmission corresponding to dynamic scheduling.

$P_{O\_PUSCH,c}(1)$ is a parameter that results from a sum of an element $P_{O\_NOMINAL\_PUSCH,c}(1)$ given by a higher layer for the cell c and an element $P_{O\_UE\_PUSCH,c}(1)$ given by the higher layer for the cell c. $P_{O\_NOMINAL\_PUSCH,c}(1)$ is a cell-specific element. $P_{O\_UE\_PUSCH,c}(1)$ is an element that is specific to the mobile station device.

$\alpha_c(1)$ is a parameter that is given by a higher layer for the cell c, and any one of {0, 0.4, 0.5, 0.6, 0.7, 0.8, 0.9, 1} is set.

$PL_c$ is an estimated path loss for the cell c, and is calculated by the mobile station device 1.

$\Delta_{TPC,c}(m,i)$ is a power control adjustment state in the subframe i for the cell c, and is defined by Equation (2) and Equation (3). To be more precise, $\Delta_{TPC,c}(m,i)$ is $f_c(i)$ for the trigger type 0/1a SRS, and $\Delta_{TPC,c}(m,i)$ is $s_c(i)$ for the trigger type 1b SRS.

$$\Delta_{TPC,c}(0,i) = \Delta_{TPC,c}(1,i) = f_c(i) \quad \text{Equation (2)}$$

$$\Delta_{TPC,c}(2,i) = S_c(i) \quad \text{Equation (3)}$$

$f_c(i)$ will be described in detail below.

$f_c(i)$ is a parameter that is used to set the transmission power for the PUSCH transmission. The base station device 3 transmits a parameter Accumulation-enabled-f indicating whether accumulation in $f_c(i)$ is enabled or disabled, to the mobile station device 1. In a case where the accumulation in $f_c(i)$ is enabled based on a parameter Accumulation-enabled_f, the mobile station device 1 determines a value of $f_c(i)$ based on Equation (4).

$$f_c(i) = f_c(i-1) + \delta_{PUSCH,c}(i - K_{PUSCH})$$

$$P_{PUSCH,c}(i) = \min\{P_{CMAX,c}(i), P_{O\_PUSCH,c}(i) + \alpha_c(1) \cdot PL_c + f_c(i)\}[dBm] \quad \text{Equation (4)}$$

$\delta_{PUSCH,c}(i-K_{PUSCH})$ is a (correction) value that is indicated by the TPC command which is included in the DCI format received on the subframe $i-K_{PUSCH}$. A TPC command corresponding to $f_c(i)$ is referred to as a first TPC command. The first TPC command corresponds to the PUSCH and the trigger type 0/1a SRS. $f_c(0)$ is the first value after accumulation setting or after resetting. For a FDD scheme, $K_{PUSHC}$ is 4. For a TDD scheme, $K_{PUSCH}$ is determined based on setting of an uplink/downlink subframe and on a number of a subframe in which the TPC command is received.

In a case where the accumulation is enabled, the first TPC command is 1 bit or 2 bits long. In a case where the accumulation is enabled and the first TPC command is 1 bit, the first TPC command indicates one of {−1, 1}. In a case where the accumulation is enabled and the first TPC command is 2 bits, the first TPC command indicates one of {−1, 0, 1, 3}. To be more precise, in the case where the accumulation is enabled, the first TPC command indicates a value that is accumulated in $f_c(i)$.

In a case where the accumulation in $f_c(i)$ is disabled based on a parameter Accumulation-enabled_f, the mobile station device 1 determines a value of $f_c(i)$ based on Equation (5).

$$f_c(i) = \delta_{PUSCH,c}(i - K_{PUSCH}) \quad \text{Equation (5)}$$

In a case where the accumulation is disabled, the first TPC command is 2 bits long. In the case where the accumulation is disabled, the first TPC command indicates one of {−4, −1, 1, 4}. To be more precise, in the case where the accumulation is disabled, the first TPC command indicates an absolute value for $f_c(i)$.

In Equation (4) or Equation (5), in a case where the mobile station device 1 does not receive the first TPC command for the subframe i for the cell c, in a case where in the TDD scheme, the subframe i for the cell c is not an uplink subframe, or in a case where discontinuous reception (DRX) occurs, the mobile station device 1 sets the $\delta_{PUSCH,c}$ to 0 dBm.

$s_c(i)$ will be described in detail below.

The base station device 3 transmits a parameter Accumulation-enabled_s indicating whether the accumulation in $s_c(i)$ is enabled or disabled, to the mobile station device 1. In a case whether the accumulation in $s_c(i)$ is enabled based on a parameter Accumulation-enabled_s, the mobile station device 1 determines a value of $s_c(i)$ based on Equation (6).

$$s_c(i)=s_c(i-1)+\delta_{SRS,c}(i-K_{PUSCH}) \quad \text{Equation (6)}$$

$\delta_{SRS,c}(i-K_{PUSCH})$ is a (correction) value that is indicated by the TPC command which is included in the DCI format received on the subframe $i-K_{PUSCH}$. A TPC command corresponding to $s_c(i)$ is referred to as a second TPC command. The second TPC command corresponds to the trigger type 1b SRS. $s_c(0)$ is the first value after accumulation setting or after the resetting.

In a case where the accumulation is enabled, the second TPC command is 1 bit or 2 bits long. In a case where the accumulation is enabled and the second TPC command is 1 bit long, the second TPC command indicates one of $\{-1, 1\}$. In a case where the accumulation is enabled and the second TPC command is 2 bits long, the second TPC command indicates one of $\{-1, 0, 1, 3\}$. To be more precise, in the case where the accumulation is enabled, the second TPC command indicates a value that is accumulated in $s_c(i)$.

In a case where the accumulation in $s_c(i)$ is enabled based on a parameter Accumulation-enabled_s, the mobile station device 1 determines a value of $s_c(i)$ based on Equation (7).

$$s_c(i)=\delta_{SRS,c}(i-K_{PUSCH}) \quad \text{Equation (7)}$$

In a case where the accumulation is disabled, the second TPC command is 2 bits long. In the case where the accumulation is disabled, the second TPC command indicates one of $\{-4, -1, 1, 4\}$. To be more precise, in the case where the accumulation is disabled, the second TPC command indicates an absolute value for $s_c(i)$.

In Equation (6) and Equation (7), in a case where the mobile station device 1 does not receive the second TPC command for the subframe i for the cell c, in the case where in the TDD scheme, the subframe i for the cell c is not an uplink subframe, or in the case where the discontinuous reception (DRX) occurs, the mobile station device 1 sets $\delta_{PUSCH,c}$ to 0 dBm.

Moreover, it is desirable that the type 1a SRS request along with the first TPC command should be included in the same DCI format. Moreover, it is desirable that the type 1b SRS request along with the second TPC command should be included in the same DCI format. Moreover, it is desirable that the type 1 SRS request along with the first TPC command and the second TPC command should be included in the same DCI format. Moreover, the DCI format 3 may be included in the first TPC command and the second TPC command at the same time.

For example, the first TPC command may be included in the uplink grant. For example, the second TPC command may be included in the downlink grant. For example, the first TPC command and the second TPC command may be included in the uplink grant and/or the downlink grant. For example, the first TPC command or the second TPC command may be included in the uplink grant and/or the downlink grant. In this case, the mobile station device 1 needs a method of determining which of the first TPC command and the second TPC command is included in the uplink grant and/or the downlink grant.

For example, based on an information bit that is included in the uplink grant and/or the downlink grant, it is determined which of the first TPC command and the second TPC command is included in the uplink grant and/or the downlink grant. For example, based on the SRS request that is included in the uplink grant and/or the downlink grant, it is determined which of the first TPC command and the second TPC command is included in the uplink grant and/or the downlink grant.

Operation of each of the mobile station device 1 and the base station device 3 according to the first embodiment will be described below.

Figure 7:
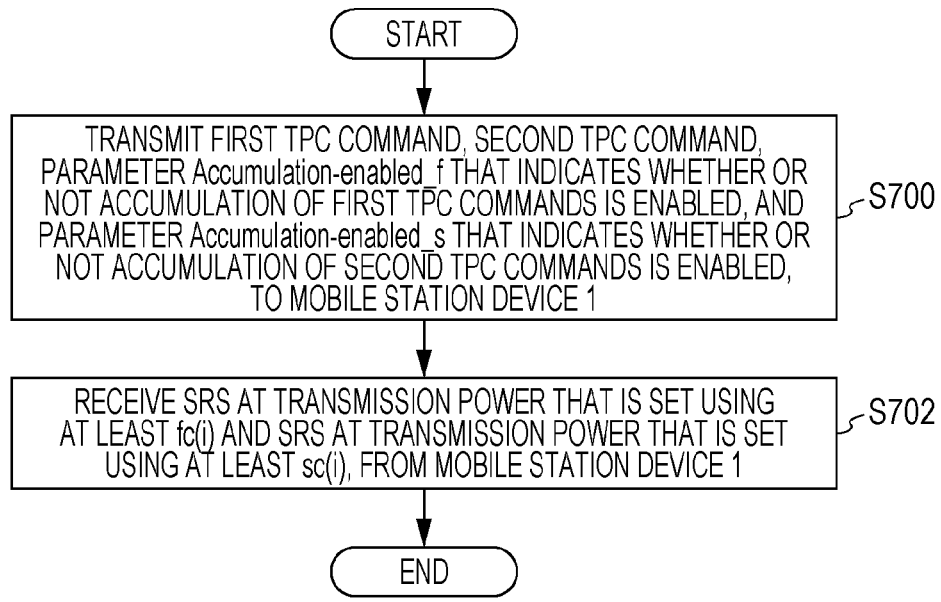
FIG. 7 is a diagram illustrating one example of operation of the base station device 3 according to the first embodiment.

FIG. 7 is a diagram illustrating one example of the operation of the base station device 3 according to the first embodiment. The base station device 3 according to the first embodiment transmits to the mobile station device 1 the first TPC command (first transmission power control command), the second TPC command (second transmission power control command), a parameter Accumulation-enabled_f (first information) indicating whether or not the accumulation of the first TPC commands is enabled, and a parameter Accumulation-enabled_s (second information) indicating whether or not the accumulation of the second TPC commands is enabled (Step S700). The base station device 3 according to the first embodiment receives from the mobile station device 1 an SRS (trigger type 0/1a SRS) for the transmission power that is set using at least $f_c(i)$ (first parameter), and an SRS (trigger type 1b SRS) for the transmission power that is set using at least $s_c(i)$ (second parameter) (Step S702).

Figure 8:
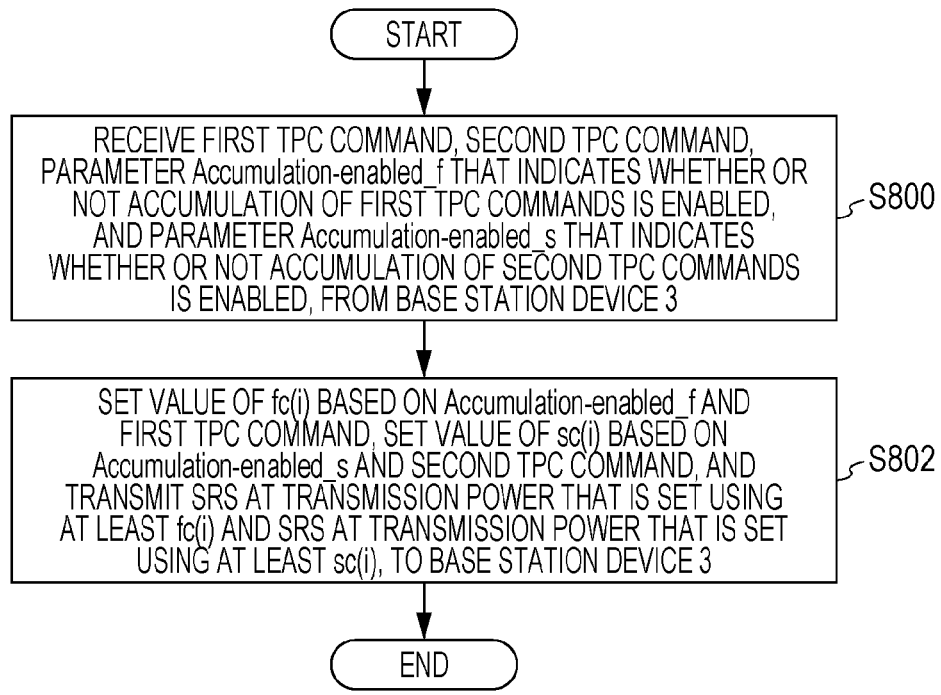
FIG. 8 is a diagram illustrating one example of operation of the mobile station device 1 according to the first embodiment.

FIG. 8 is a diagram illustrating one example of the operation of the mobile station device 1 according to the first embodiment. The mobile station device 1 according to the first embodiment receives from the base station device 3 the first TPC command (first transmission power control command), the second TPC command (second transmission power control command), a parameter Accumulation-enabled_f (first information) indicating whether or not the accumulation of the first TPC commands is enabled, and a parameter Accumulation-enabled_s (second information) indicating whether or not the accumulation of the second TPC commands is enabled (Step S800).

The mobile station device 1 according to the first embodiment sets a value of $f_c(i)$ (first parameter) based on Accumulation-enabled_f and the first TPC command, and sets a value of $s_c(i)$ (second parameter) based on Accumulation-enabled_s and the second TPC command. The mobile station device 1 according to the first embodiment transmits to the base station device 3 the SRS (trigger type 0/1a SRS) for the transmission power that is set using at least $f_c(i)$, and the SRS (trigger type 1b SRS) for the transmission power that is set using at least $s_c(i)$ (Step S802).

Moreover, the mobile station device 1 according to the first embodiment accumulates values of the first TPC commands and sets $f_c(i)$ to a value that results from the accumulation, in a case where the accumulation of the first TPC commands is enabled based on Accumulation-enabled_f, and sets $f_c(i)$ to the value of the first TPC command in a case where the accumulation of the first TPC commands is disabled based on Accumulation-enabled_f.

Moreover, the mobile station device 1 according to the first embodiment accumulates values of the second TPC commands and sets $s_c(i)$ to a value that results from the accumulation, in a case where the accumulation of the second TPC commands is enabled based on Accumulation-enabled_s, and sets $s_c(i)$ to the value of the second TPC command in a case where the accumulation of the second TPC commands is disabled based on Accumulation-enabled_s.

Accordingly, the base station device 3 can independently control whether the accumulation of the TPC commands that correspond to the trigger type 0/1a SRS and the trigger type 1b SRS, respectively, is set to be enabled or disabled. Then, the mobile station device 1 and the base station device 3 can efficiently handle multiple transmission power control processes for the SRS.

The second embodiment of the present invention will be described below.

FIG. 9 is a diagram illustrating one example of operation of a base station device 3 according to the second embodiment. The base station device 3 according to the second embodiment may not transmit Accumulation-enabled_f and Accumulation-enabled_s to the mobile station device 1. Then, the first TPC command (first transmission power control command), the second TPC command (second transmission power control command), and a parameter Accumulation-enabled_fs (information) indicating whether or not the accumulation of the TPC commands is enabled are transmitted to the mobile station device 1 (Step S900). The base station device 3 according to the second embodiment receives from the mobile station device 1 SRS (trigger type 0/1a SRS) for the transmission power that is set using at least $f_c(i)$ (first parameter), and SRS (trigger type 1b SRS) for the transmission power that is set using at least $s_c(i)$ (second parameter) (Step S902).

The mobile station device 1 according to the second embodiment sets the transmission power for the trigger type 0/1a/1b SRS that is transmitted in the subframe i for the cell c, based on Equations (1) to (7).

FIG. 10 is a diagram illustrating one example of operation of a mobile station device 1 according to the second embodiment. The mobile station device 1 according to the second embodiment receives from the base station device 3 the first TPC command (first transmission power control command), the second TPC command (second transmission power control command), and a parameter Accumulation-enabled_fs (information) indicating whether or not the accumulation of the TPC commands is enabled (Step S1000).

The mobile station device 1 according to the second embodiment sets the value of $f_c(i)$ (first parameter) based on Accumulation-enabled_fs and the first TPC command, and sets the value of $s_c(i)$ (second parameter) based on Accumulation-enabled_fs and the second TPC command. The mobile station device 1 according to the second embodiment transmits to the base station device 3 the SRS (trigger type 0/1a SRS) for the transmission power that is set using at least $f_c(i)$, and the SRS (trigger type 1b SRS) for the transmission power that is set using at least $s_c(i)$ (Step S1002).

In a case where the accumulation in $f_c(i)$ and $s_c(i)$ is enabled based on a parameter Accumulation-enabled_fs, the mobile station device 1 according to the second embodiment determines the value of $f_c(i)$ based on Equation (4) and the value of $s_c(i)$ based on Equation (6). In a case where the accumulation in $f_c(i)$ and $s_c(i)$ is disabled based on a parameter Accumulation-enabled_fs, the mobile station device 1 according to the second embodiment determines the value of $f_c(i)$ based on Equation (5) and the value of $s_c(i)$ based on Equation (7).

Accordingly, because whether or not the accumulation of the TPC commands that correspond to the trigger type 0/1a SRS and the trigger type 1b SRS, respectively, is set to be enabled is controlled using a single parameter Accumulation-enabled_fs, the base station device 3 can reduce a downlink signal overhead. Furthermore, the mobile station device 1 and the base station device 3 can efficiently handle multiple transmission power control processes for the SRS.

The third embodiment of the present invention will be described below.

Figure 11:
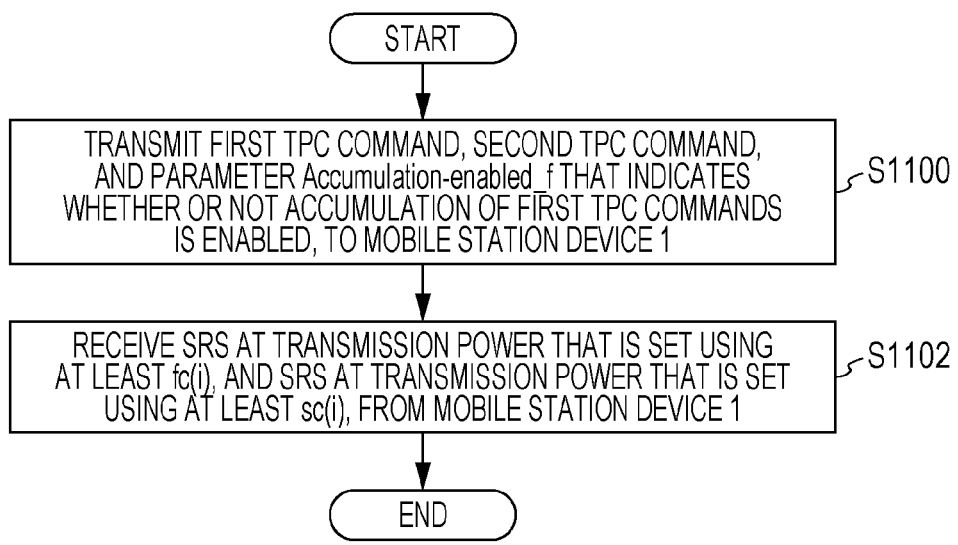
FIG. 11 is a diagram illustrating one example of operation of the base station device 3 according to a third embodiment.

FIG. 11 is a diagram illustrating one example of operation of a base station device 3 according to the third embodiment. The base station device 3 according to the third embodiment transmits to the mobile station device 1 the first TPC command (first transmission power control command), the second TPC command (second transmission power control command), and a parameter Accumulation-enabled_f (information) indicating whether or not the accumulation of the first TPC commands is enabled (Step S1100). The base station device 3 according to the third embodiment receives from the mobile station device 1 the SRS (trigger type 0/1a SRS) for the transmission power that is set using at least $f_c(i)$ (first parameter), and the SRS (trigger type 1b SRS) for the transmission power that is set using at least $s_c(i)$ (second parameter) (Step S1102). The base station device 3 according to the third embodiment may not transmit Accumulation-enabled_s and Accumulation-enabled_fs to the mobile station device 1.

The mobile station device 1 according to the third embodiment sets the transmission power for the trigger type 0/1a/1b SRS that is transmitted in the subframe i for the cell c, based on Equations (1) to (6). The mobile station device 1 according to the third embodiment determines the value of $s_c(i)$ at all times, based on Equation (6). To be more precise, the mobile station device 1 according to the third embodiment may not determine the value of $s_c(i)$ based on Equation (7).

Figure 12:
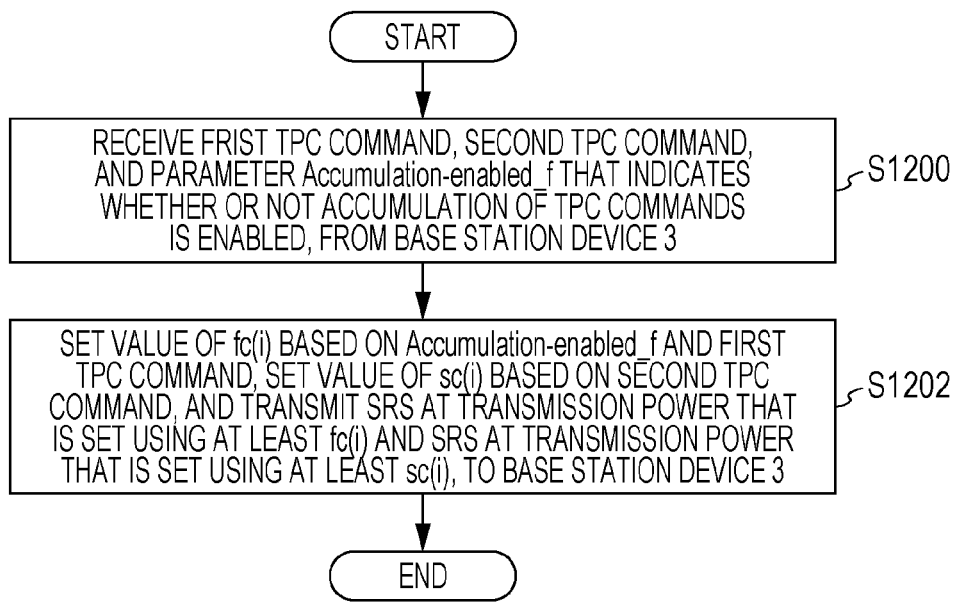
FIG. 12 is a diagram illustrating one example of operation of the mobile station device 1 according to the third embodiment.

FIG. 12 is a diagram illustrating one example of operation of a mobile station device 1 according to the third embodiment. The mobile station device 1 according to the third embodiment receives from the base station device 3 the first TPC command (first transmission power control command), the second TPC command (second transmission power control command), and a parameter Accumulation-enabled_f (information) indicating whether or not the accumulation of the TPC commands is enabled (Step S1200).

The mobile station device 1 according to the second embodiment sets the value of $f_c(i)$ (first parameter) based on Accumulation-enabled_f and the first TPC command, and sets the value of $s_c(i)$ (second parameter) based on the second TPC command. The mobile station device 1 according to the second embodiment transmits to the base station device 3 the SRS (trigger type 0/1a SRS) for the transmission power that is set using at least $f_c(i)$, and the SRS (trigger type 1b SRS) for the transmission power that is set using at least $s_c(i)$ (Step S1202).

In the case where the accumulation in $f_c(i)$ is enabled based on a parameter Accumulation-enabled_f, the mobile station device 1 according to the third embodiment determines the value of $f_c(i)$ based on Equation (4). In the case where the accumulation in $f_c(i)$ is disabled based on a parameter Accumulation-enabled_f, the mobile station device 1 according to the third embodiment determines the value of $f_c(i)$ based on Equation (5). The mobile station device 1 according to the third embodiment, at all times, accumulates the values of the second TPC commands and sets $s_c(i)$ to a value that results from the accumulation.

Because $f_c(i)$ is a parameter that is used in the PUSCH, and supports enabled and disabled states of the accumulation in the related art, it is desirable that the mobile station device 1 and the base station device 3 according to the third embodiment should support both of the enabling and the disabling of the accumulation in $f_c(i)$ as well.

In the case where the accumulation is enabled, the values of $f_c(i)$ and $s_c(i)$ can be freely changed by accumulating the values of multiple TPC commands. However, a case where the accumulation is disabled has the drawback that the values of $f_c(i)$ and $s_c(i)$ can be changed only within a determined range. Then, according to the third embodiment, the accumulation in $s_c(i)$ corresponding to only the trigger type 1b SRS is always enabled.

Accordingly, because it is possible that the base station device 3 may not transmit a parameter Accumulation-enabled_s, the downlink signal overhead can be reduced, compared to the first embodiment. Furthermore, the mobile station device 1 and the base station device 3 can efficiently handle multiple transmission power control processes for the SRS.

A program running on the base station device 3 and the mobile station device 1 according to the present invention may be a program (a program for causing a computer to operate) that controls a CPU (Central Processing Unit) and the like in such a manner as to realize the functions according to the embodiments of the present invention, which are described above. Then, the information that is handled in these devices is temporarily stored in a Random Access Memory (RAM) while being processed. Thereafter, the information is stored in various types of ROM such as a Flash Read Only Memory (ROM) or a Hard Disk Drive (HDD) and, whenever necessary, is read by the CPU to be modified or rewritten.

Moreover, one portion of the mobile station device 1 and the base station device 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is defined as a computer system built into the mobile station device 1 or the base station device 3 and as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may include a medium that dynamically retains the program for a short period of time, such as a communication line that is used when transmitting the program over a network such as the Internet or over a communication circuit such as a telephone circuit and a medium that retains the program for a constant period of time, such as a volatile memory within the computer system, which functions as a server or a client in a case of including the program dynamically. Furthermore, the program may be one for realizing some of the functions described above and additionally may be one that can realize the functions described above in combination with a program that is already recorded on the computer system.

Furthermore, some portions of or all portions of the mobile station device 1 and the base station device 3 according to the embodiment, which is described, may be realized as an LSI that is a typical integrated circuit and be realized as a chip set. Each functional block of the mobile station device 1 and the base station device 3 may be individually realized as a chip, and some of, or all of the functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a circuit integration technology is applied.

The embodiments of the invention are described in detail above referring to the drawings, but a specific configuration is not limited to those described above and it is possible to make various design modifications and the like within a scope not deviating from the gist of the present invention.

DESCRIPTION OF REFERENCE NUMERALS 1 (1A, 1B, 1C) MOBILE STATION DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
1015 TRANSMISSION POWER SETTING UNIT
3011 RADIO RESOURCE CONTROL UNIT
3013 SCHEDULING UNIT
3015 CONTROL INFORMATION GENERATION UNIT

The invention claimed is:
1. A mobile station apparatus comprising:
reception circuitry configured to and/or programmed to receive TPC (transmission power control) commands and a first parameter associated with accumulation of TPC commands; and
transmission circuitry configured to and/or programmed to:
   transmit, in subframe i in a certain cell, a sounding reference signal with a transmission power based on at least a second parameter and a third parameter, the third parameter being configured by higher layers; and
   transmit, in subframe j in a same cell as the certain cell, a sounding reference signal with a transmission power based on at least a fourth parameter and a fifth parameter, the fifth parameter being configured by the higher layers, wherein
in a case that the accumulation is enabled on the basis of the first parameter:
   a value of the second parameter for the subframe i in the certain cell is calculated by adding a value of the second parameter for subframe i−1 in the certain cell to a value of a TPC command; and
   a value of the fourth parameter for the subframe j in the same cell as the certain cell is calculated by adding a value of the fourth parameter for subframe j−1 in the same cell as the certain cell to a value of a TPC command;
in a case that the accumulation is not enabled on the basis of the first parameter:
   a value of the second parameter for the subframe i in the certain cell is a value of a TPC command; and
   a value of the fourth parameter for the subframe j in the same cell as the certain cell s a value of a TPC command;

the value of the second parameter for the subframe i and a value of the fourth parameter for the subframe i are separately calculated; and the value of the fourth parameter for the subframe j and a value of the second parameter for the subframe j are separately calculated.

2. A base station apparatus comprising:

transmission circuitry configured to and/or programmed to transmit TPC (transmission power control) commands and a first parameter associated with accumulation of TPC commands; and reception circuit configured to and/or programmed to:
  receive, in subframe i in a certain cell, a sounding reference signal with a transmission power based on at least a second parameter and a third parameter, the third parameter being configured by higher layers; and
  receive, in subframe j in a same cell as the certain cell, a sounding reference signal with a transmission power based on at least a fourth parameter and a fifth parameter, the fifth parameter being configured by the higher layers, wherein in a case that the accumulation is enabled on the basis of the first parameter:
  a value of the second parameter for the subframe i in the certain cell is calculated by adding a value of the second parameter for subframe i−1 in the certain cell to a value of a TPC command; and
  a value of the fourth parameter for the subframe j in the same cell as the certain cell is calculated by adding a value of the fourth parameter for subframe j−1 in the same cell as the certain cell to a value of a TPC command;

in a case that the accumulation is not enabled on the bask of the first parameter:
  a value of the second parameter for the subframe i in the certain cell is a value of a TPC command; and
  a value of the fourth parameter for the subframe j in the same cell as the certain cell s a value of a TPC command;

the value of the second parameter for the subframe i and a value of the fourth parameter for the subframe i are separately calculated; and the value of the fourth parameter for the subframe j and a value of the second parameter for the subframe j are separately calculated.

3. A communication method of a mobile station apparatus, the communication method comprising:

receiving TPC (transmission power control) commands and a first parameter associated with accumulation of TPC commands;

transmitting, in subframe i in a certain cell, a sounding reference signal with a transmission power based on at least a second parameter and a third parameter, the third parameter being configured by higher layers; and transmitting, in subframe j in a same cell as the certain cell, a sounding reference signal with a transmission power based on at least a fourth parameter and a fifth parameter, the fifth parameter being configured by the higher layers, wherein in a case that the accumulation is enabled on the basis of the first parameter:
  a value of the second parameter for the subframe i in the certain cell is calculated by adding a value of the second parameter for subframe i−1 in the certain cell to a value of a TPC command; and
  a value of the fourth parameter for the subframe j in the same cell as the certain cell is calculated by adding a value of the fourth parameter for subframe j−1 in the same cell as the certain cell to a value of a TPC command;

in a case that the accumulation is not enabled on the basis of the first parameter:
  a value of the second parameter for the subframe i in the certain cell is a value of a TPC command; and
  a value of the fourth parameter for the subframe j in the same cell as the certain cell s a value of a TPC command;

the value of the second parameter for the subframe i and a value of the fourth parameter for the subframe i are separately calculated; and the value of the fourth parameter for the subframe j and a value of the second parameter for the subframe j are separately calculated.

4. A communication method of a base station apparatus comprising:

transmitting TPC (transmission power control) commands and a first parameter associated with accumulation of TPC commands;

receiving, in subframe i in a certain cell, a sounding reference signal with a transmission power based on at least a second parameter and a third parameter, the third parameter being configured by higher layers; and receiving, in subframe j in a same cell as the certain cell, a sounding reference signal with a transmission power based on at least a fourth parameter and a fifth parameter, the fifth parameter being configured by the higher layers, wherein in a case that the accumulation is enabled on the basis of the first parameter:
  a value of the second parameter for the subframe i in the certain cell is calculated by adding a value of the second parameter for subframe i−1 in the certain cell to a value of a TPC command; and
  a value of the fourth parameter for the subframe j in the same cell as the certain cell is calculated by adding a value of the fourth parameter for subframe j−1 in the same cell as the certain cell to a value of a TPC command;

in a case that the accumulation is not enabled on the basis of the first parameter:
  a value of the second parameter for the subframe i in the certain cell is a value of a TPC command; and
  a value of the fourth parameter for the subframe j in the same cell as the certain cell s a value of a TPC command;

the value of the second parameter for the subframe i and a value of the fourth parameter for the subframe i are separately calculated; and the value of the fourth parameter for the subframe j and a value of the second parameter for the subframe j are separately calculated.

5. The mobile station apparatus according to claim 1, wherein
the TPC command used to calculate the value of the second parameter for any subframes is not used to calculate the value of the fourth parameter for any subframes.

6. The base station apparatus according to claim 2, wherein
the TPC command used to calculate the value of the second parameter for any subframes is not used to calculate the value of the fourth parameter for any subframes.

7. The communication method according to claim 3, wherein the TPC command used to calculate the value of the second parameter for any subframes is not used to calculate the value of the fourth parameter for any subframes.

8. The communication method according to claim 4, wherein the TPC command used to calculate the value of the second parameter for any subframes is not used to calculate the value of the fourth parameter for any subframes.

* * * * *